Patented Jan. 23, 1951

2,538,810

UNITED STATES PATENT OFFICE 2,538,810

COPOLYMERS OF DIALLYL ESTERS OF DI-CARBOXYLIC ACIDS WITH DI BETA, GAMMA, UNSATURATED ALKENYL ARYL-PHOSPHONATES

Arthur Dock Fon Toy, Chicago, Ill., assignor to Victor Chemical Works, a corporation of Illinois No Drawing. Application October 11, 1947, Serial No. 779,416

11 Claims. (Cl. 260—78.5)

This invention relates to copolymers of diallyl esters of dicarboxylic acids and di beta, gamma unsaturated alkenyl arylphosphonates.

I have discovered that diallyl esters of phthalic acid and saturated dicarboxylic acids may be reacted with di beta, gamma unsaturated alkenyl arylphosphonates to produce substantially nonflammable, hard, tough, solid resinous copolymers. These copolymers are infusible and insoluble and may be cast, shaped, polished, and otherwise worked to produce useful products. The resin copolymers are produced by mixing monomeric di beta, gamma unsaturated alkenyl arylphosphonates with diallyl esters of dicarboxylic acids and heating the mixture. The reacting materials will react in all proportions to produce useful resins. In order to accelerate the reaction, it is preferred that a catalyst be employed. These catalysts are preferably organic peroxides.

Among the diallyl esters of dicarboxylic acids which may be employed in forming the copolymers with the phosphonate esters, the following are preferred: diallyl oxalate, diallyl succinate, diallyl phthalate, diallyl sebacate, diallyl adipate, diallyl diethylene glycol dicarbonate, and the like.

Suitable phosphonate esters include diallyl phenylphosphonate, dimethallyl phenylphosphonate, diallyl tolylphosphonate, dimethallyl tolylphosphonate, diallyl chlorophenylphosphonate, dicrotyl phenylphosphonate, and the like. These esters may be prepared in accordance with the process described in my U. S. Patent No. 2,425,765, issued August 19, 1947, which comprises reacting an aryl phosphorus oxydichloride with a beta, gamma unsaturated alcohol and separating the diester from the reaction mixture. These esters may be employed in the form of monomeric esters, or as partially polymerized liquids.

Suitable polymerization catalysts include, benzoyl peroxide, acetyl peroxide, t-butyl perbenzoate, and many other organic peroxides. Benzoyl peroxide is generally preferred because of its availability and the ease with which it may be incorporated in the mixtures.

The diallyl esters of the dicarboxylic acids and the di beta, gamma unsaturated alkenyl arylphosphonates will copolymerize in all proportions but only those having 10% or more of the phosphonate show satisfactory flame resistance.

Conditions for the copolymerization of the mixtures of esters herein disclosed will vary according to the nature and proportions of the monomers, the thickness and degree of hardness desired in the finished products, and similar variables. The polymerizing reaction is exothermic. The first stage of the reaction is more critical than after the mixture has set into a gel form. Therefore, it is generally preferred to carry out the first stage of the reaction at temperatures of about 60 to 80° C. After the material has started to form a gel, the temperature may be raised to 90 to 120° C. without detrimental effect on the character of the resin product.

The general procedure employed is to mix the liquid monomeric esters at room temperature with the desired amount of catalyst. The liquid mixture is then poured into molds of the desired shape, or used to impregnate fabrics for the production of laminates with glass cloth or other fibrous materials, and the mixture heated at a polymerizing temperature for a sufficient period to complete the copolymerization.

The following table shows the copolymerization of diallyl phenylphosphonate and diallyl oxalate in various proportions. Benzoyl peroxide was used as the catalyst in an amount equal to 2% by weight of the starting mixtures. The mixtures were heated at 70° C. for 24 hours and 90° C. for 24 hours.

Table 1

| Ratio of Monomers (by volume) | | Properties of Resin Products |
|---|---|---|
| Diallyl Oxalate | Diallyl Phenyl Phosphonate | |
| 10 | 0 | Hard, brittle yellow resin. Burns readily. |
| 9.5 | 0.5 | Strong light yellow resin. Flammable. |
| 9 | 1 | Hard, strong, light yellow resin. Self-extinguishing. |
| 8 | 2 | Same. |
| 7 | 3 | Same, except lighter color. |
| 6 | 4 | Same. |
| 5 | 5 | Very light yellow, strong resin. Self-extinguishing. |
| 4 | 6 | Same. |
| 3 | 7 | Same. |
| 2 | 8 | Same. |
| 1 | 9 | Same. |
| 0 | 10 | Hard, yellow solid, self-extenguishing. |

Ratios are in parts by volume.

In the above experiments it was noted that the copolymers had a lighter color than either of the polymerized monomers alone.

Table 2 shows a series of tests on the copolymerization of diallyl succinate with diallyl phenylphosphonate using 2% benzoyl peroxide as the catalyst, and heating the mixture for 24 hours at 70° C., and 24 hours at 90° C. The mixtures were heated in bottles in layers from ⅛ to ¼ inch in thickness.

Table 2

| Ratio of Monomers (by volume) | | Properties of Resin Products |
|---|---|---|
| Diallyl Succinate | Diallyl Phenyl Phosphonate | |
| 10 | 0 | Clear, hard, strong resin. Burns readily. |
| 9.5 | 0.5 | Same. |
| 9 | 1 | Water white, clear, strong resin. Appreciable flame resistance. |
| 8 | 2 | Slightly colored, hard, strong resin. Self-extinguishing. |
| 7 | 3 | Same. |
| 6 | 4 | Light yellow, hard resin. Self-extinguishing. |
| 5 | 5 | Same. |
| 4 | 6 | Same, except darker color. |
| 3 | 7 | Same. |
| 2 | 8 | Same. |
| 1 | 9 | Hard, clear, light yellow resin. Self-extinguishing. |

Table 3 shows a series of tests on the copolymerization of diallyl phthalate with diallyl phenylphosphonate in various proportions using 2% benzoyl peroxide catalyst. The mixtures were heated in bottles in layers approximately ⅛ inch thick, for 23 hours at 65° C., 6 hours at 90° C., and 18 hours at 115° C.

Table 3

| Ratio of Monomers (by volume) | | Properties of Resin Products |
|---|---|---|
| Diallyl Phthalate | Diallyl Phenyl-Phosphonate | |
| 10 | 0 | Hard, strong, clear, yellow resin, burns with smoky flame. |
| 9 | 1 | Hard, strong, clear, light yellow resin. Self-extinguishing. |
| 8 | 2 | Same. |
| 7 | 3 | Same. |
| 6 | 4 | Same. |
| 5 | 5 | Same. |
| 4 | 6 | Same. |

It was found that the most desirable ratios in the above tables were between 7 and 8 parts by volume of the diallyl ester and 3 and 2 parts of the phosphonate. These ranges gave solid resins of good appearance and with self-estinguishing characteristics.

In another set of examples diallyl phenylphosphonate was copolymerized with CR-39, a commercial diallyl ester of a dicarboxylic acid and has the formula

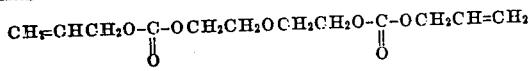

CR-39 is diallyl diethylene glycol dicarbonate. The monomeric esters were mixed in the desired proportions, 2.5% benzoyl peroxide catalyst added, and the liquid mixture heated for 16 hours at 80° C. The results are shown in the following Table 4.

Table 4

| Monomer Ratio (by volume) | | Properties of Product |
|---|---|---|
| Diallyl Phenyl Phosphonate | Ester CR-39 | |
| 0 | 10 | Hard, water white, clear resin. Supports flame when ignited. |
| 3 | 7 | Hard, water white, clear resin. Self-extinguishing. |
| 5 | 5 | Same except for faint yellow color. |
| 7 | 3 | Same. |

In another example, the commercial ester CR-39 was mixed with dimethallyl phenylphosphonate in equal volumes and 2.5% benzoyl peroxide added. The mixture was heated in a layer approximately ⅛ inch in thickness for 16 hours at 80° C. The resulting copolymer product was a hard, water white clear resin of self-extinguishing character.

A typical example using a different phosphonate monomer was carried out by mixing one part by volume of diallyl tolylphosphonate with 4 parts diallyl phthalate, and 2% benzoyl peroxide catalyst, and heating the mixture 23 hours at 65° C., 6 hours at 90° C. and 18 hours at 115° C. The product was a clear, amber colored, hard, solid resin of self-extinguishing character.

In another example 3 parts of dimethallyl tolylphosphonate, 7 parts of diallyl phthalate, by volume, and 2% benzoyl peroxide were mixed, and the liquid mixture heated 23 hours at 65° C., 6 hours at 90° C., and 18 hours at 115° C. The resin product was a clear, yellow, solid of self-extinguishing character.

In order to illustrate the possibility of copolymerizing partially prepolymerized esters the following example is given. A viscous liquid diallyl phthalate prepolymer having a refractive index of $$\frac{20}{D} = 1.535$$

obtained from the Shell Development Company, was mixed with an equal volume of a diallyl phenylphosphonate prepolymer prepared by heating diallyl phenylphosphonate with 0.22% benzoyl peroxide at 100° C. for 2½ hours and distilling off a large portion of the unpolymerized ester to give a viscous liquid having a refractive index $$\frac{25}{D} = 1.5303$$

The viscous liquid mixture was catalyzed with 2.5% benzoyl peroxide, and heated for 16 hours at 80° C. The resulting resin product was a hard, clear, yellow solid of self-extinguishing character. By partial prepolymerization of the individual starting components the period of time required to complete the copolymerization may be reduced as illustrated by the above example.

All of the resin products produced in the above described examples are infusible. They may be cut, machined, and polished without difficulty. They are insoluble and unaffected by water, dilute alkaline and acid solutions, and most of the organic solvents, such as benzene, carbon tetrachloride, petroleum naphtha, alcohol, and the like.

The term "self-extinguishing" means that when the resin is ignited in a flame it will cease burning when removed from such flame.

Having described my invention as related to various embodiments of the same, it is my intention that the invention be not limited by any of the details of description unless otherwise specified, but rather be construed broadly within its spirit and scope as set out in the accompanying claims.

I claim:

1. A resin product comprising a copolymer of seven parts by volume of diallyl oxalate and three parts of diallyl phenylphosphonate.

2. A resin product comprising a copolymer of seven parts by volume of diallyl succinate and three parts of diallyl phenylphosphonate.

3. A resin product comprising a copolymer of seven parts by volume of diallyl phthalate and three parts of diallyl phenylphosphonate.

4. A resin product comprising a copolymer of from 10 to 90 parts by volume of a di beta, gamma unsaturated alkenyl arylphosphonate and 90 to 10 parts of a diallyl ester of a member of the class consisting of saturated aliphatic dicarboxylic acids and phthalic acid.

5. The product of claim 4 wherein the arylphosphonate is diallyl phenylphosphonate.

6. The product of claim 4 wherein the arylphosphonate is dimethallyl phenylphosphonate.

7. The product of claim 4 wherein the arylphosphonate is dimethallyl tolylphosphonate.

8. The product of claim 4 wherein the dicarboxylic acid is oxalic acid.

9. The product of claim 4 wherein the dicarboxylic acid is succinic acid.

10. A thermosetting, flame resisting resin product comprising a copolymer of a di beta, gamma unsaturated alkenyl arylphosphonate and a diallyl ester of a member of the class consisting of saturated aliphatic dicarboxylic acids and phthalic acid.

11. A resin product comprising a copolymer of from 10 to 90 parts by volume of a di beta, gamma unsaturated alkenyl arylphosphonate and 90 to 10 parts of a diallyl ester of phthalic acid.

ARTHUR DOCK FON TOY.

REFERENCES CITED

The following references are of record in the file of this patent:

UNITED STATES PATENTS

| Number | Name | Date |
| --- | --- | --- |
| 2,218,439 | Rothrock | Oct. 15, 1940 |
| 2,332,900 | D'Alelio | Oct. 26, 1943 |
| 2,425,765 | Toy | Aug. 19, 1947 |